United States Patent [19]

Kowal

[11] Patent Number: 4,780,298

[45] Date of Patent: Oct. 25, 1988

[54] AMMONIA SYNTHESIS

[75] Inventor: Wieslaw M. Kowal, Henley, United Kingdom

[73] Assignee: Foster Wheeler USA Corporation, Clinton, N.J.

[21] Appl. No.: 16,891

[22] Filed: Feb. 20, 1987

[30] Foreign Application Priority Data

Feb. 26, 1986 [GB] United Kingdom ............... 8604690

[51] Int. Cl.$^4$ .................................................. C01C 1/04
[52] U.S. Cl. .................................................. 423/359
[58] Field of Search ....................................... 423/359

[56] References Cited

U.S. PATENT DOCUMENTS

| | | | |
|---|---|---|---|
| 4,058,589 | 11/1977 | Haslam | 423/359 |
| 4,296,085 | 10/1981 | Banquy | 252/373 |
| 4,409,196 | 10/1983 | Skinner et al. | 423/359 |
| 4,524,056 | 6/1985 | Banquy | 423/359 |
| 4,568,530 | 2/1986 | Mandelik et al. | 423/359 |
| 4,572,829 | 2/1986 | Fuderer | 423/359 |
| 4,613,492 | 9/1986 | Winter | 423/359 |

Primary Examiner—John Doll
Assistant Examiner—Wayne A. Langel
Attorney, Agent, or Firm—Marvin A. Naigur; Robert D. Bajefsky; Lawrence M. Lavin, Jr.

[57] ABSTRACT

An ammonia production process in which excess nitrogen and traces of carbon oxides are removed from raw ammonia synthesis gas firstly by application of partial condensation and secondly by application of washing action provided by carbon-oxides-free liquified gas, rich in nitrogen, which is derived from a cryogenic process used preferentially for separation of hydrogen from the ammonia synthesis loop purge gas as produced in processes which use excess of nitrogen above stoichiometric requirements in the circulating gas in the synthesis loop.

7 Claims, 1 Drawing Sheet

AMMONIA SYNTHESIS

FIELD OF INVENTION

This invention relates to an ammonia production process and in particular to a process in which the crude synthesis gas contains an excess of nitrogen.

BACKGROUND OF INVENTION

A common feature of a number of low energy using plants and processes for ammonia production is that at some stage in the process the synthesis gas contains excess nitrogen and is subjected to a nitrogen separation stage. The excess nitrogen is removed in various ways e.g. from the synthesis gas before the ammonia synthesis loop or from the purge gas with an arrangement allowing hydrogen from the purge gas to be recycled to the synthesis stage. Examples of processes employing a nitrogen separation stage are disclosed in U.S. Pat. Nos. 3,442,613, 4,298,588 and 4,409,196.

In the air partial oxidation process (APO process) disclosed in U.S. Pat. No. 4,409,196 a feed gas stream for ammonia is produced by the steps of (a) partially oxidising oil, coal, natural gas or any combination thereof in the presence of air generally at a pressure of 15 to 150 bar and at a temperature of 300° C. to 2000° C. to produce a raw gas stream containing hydrogen and nitrogen with a stoichiometric excess of nitrogen of at least 200 mole percent based upon that needed for ammonia synthesis, together with carbon oxides, methane and hydrogen sulphide if sulphur was present in the oil, coal or gas, (b) treating the raw gas stream from step (a) to remove substantially all component gases other than hydrogen and nitrogen, (c) drying the raw gas stream from step (b) if water is present, (d) subjecting the raw gas stream from step (c) to a nitrogen separation stage e.g. in a cryogenic separator, to separate (1) a hydrogen-nitrogen feed gas stream having a predetermined hydrogen:nitrogen ratio suitable for ammonia synthesis and (2) a nitrogen-rich gas stream and (e) injecting the hydrogen nitrogen gas stream (1) into a reactor for ammonia synthesis.

The nitrogen-rich gas stream may be heated and then expanded in a turbine to generate power.

In one embodiment of the APO process the raw gas stream from the partial oxidation is passed over a shift catalyst and reacted with steam at elevated temperature to convert carbon monoxide present in the raw gas stream to carbon dioxide and hydrogen. The carbon dioxide content of the gas stream is then removed together with any hydrogen sulphide e.g. by scrubbing with hot potassium carbonate and thereafter the gas stream is subjected to a methanation stage to remove any residual carbon oxides. In the methanation stage the carbon oxides are reacted with hydrogen on a catalytic surface to produce methane and water. Purification of synthesis gas in this way to remove the residual carbon oxides is wasteful because the reaction consumes hydrogen which has been expensively produced in the upstream steps and is required for ammonia synthesis. After methanation the synthesis gas is dried and fed into the reactor.

In an alternative embodiment, in order to limit the loss of hydrogen due to methanation, only a fraction of the synthesis gas is methanated, e.g. 20 to 40% of the total gas stream. The remaining and larger gas stream fraction is then dried and subjected to removal of the residual carbon dioxide by adsorption, while the smaller fraction is dried. After partial liquifaction this smaller fraction provides carbon monoxide free liquid wash to the remaining portion of the feed gas in the wash column. The two synthesis gas fractions are fed separately to the cryogenic seperation plant.

U.S. Pat. No. 4,298,588 discloses an ammonia production process (AMV process) which comprises:

(a) primary catalytically reforming at superatmospheric pressure of a hydrocarbon feedstock with steam in order to produce a gas containing carbon oxides, hydrogen and methane;

(b) secondary catalytically reforming the gas from step (a) by introducing air and bringing the mixture towards chemical equilibrium, whereby to produce a gas containing nitrogen, carbon oxides, hydrogen and a decreased quantity of methane;

(c) converting carbon monoxide catalytically with steam to carbon dioxide and hydrogen;

(d) removing carbon oxides to give a nitrogen-hydrogen ammonia synthesis gas and compressing said gas to ammonia synthesis pressure;

(e) reacting the synthesis gas to produce ammonia and recovering ammonia from the reacted gas; and (f) discarding non-reactive gases present in the synthesis gas;

in which:

step (a) is conducted at a pressure of 40–80 bar absolute and in conditions of steam-to-carbon ratio and temperature to produce a gas containing at least 10% v/v methane and using in step (b) a quantity of air in excess of what would introduce 1 molecule of nitrogen per 3 molecules of hydrogen; and the reacted synthesis gas is treated to remove ammonia and to separate a gas stream enriched in hydrogen and the hydrogen-enriched stream is returned to the ammonia synthesis.

The hydrogen separation treatment in the AMV process can be by any suitable means, for example by cryogenic fractionation, molecular sieve adsorption of gases other than hydrogen or palladium membrane diffusion. The hydrogen stream returned to the synthesis can be substantially (over 90% v/v) pure but in any event gas recycled to the reactor should contain at least 3 molecules of hydrogen per nitrogen molecule. The non-reactive gases discarded from the hydrogen separation treatment in a side stream should of course be substantially free of hydrogen, since any discarded hydrogen represents wasted energy. If the side stream contains methane, the separation treatment can be designed and operated to separate a methane-rich element and that element can be used as process feed or furnace fuel for step (a) or feed to step (b). A typical side stream flow rate is in the range 15 to 30% of total gas flow.

A cryogenic purification of the hydrogen stream in the AMV process comprises the stages:

(a) subjecting it in a first indirect cooling stage to heat exchange with one or more cool streams to be described;

(b) cooling the product of stage (a) by expansion in an engine:

(c) subjecting the engine effluent in a second indirect cooling stage to heat exchange with one or more cold streams to be described, whereby to decrease its temperature to below the dewpoint of nitrogen;

(d) separating a liquid phase containing nitrogen, methane and possibly noble elements;

(e) passing the hydrogen-enriched gaseous phase resulting from step (d) into heat exchange in stage (c) as one of the cold streams, (f) passing the hydrogen-depleted liquid phase from stage (d) into heat exchange in stage (c) as one of the said cold streams; streams thus warmed in stages (e)

(g) passing the streams thus warmed in stages (e) and (f) into heat exchange in stage (a) as the said cool streams;

(h) passing the hydrogen enriched gaseous phase back to the synthesis loop.

Usually the hydrogen-depleted phase will evaporate in stage (f) and possibly in part in stage (g). It is then discarded possibly by discharging it to atmosphere or by possibly using it as an auxiliary coolant or as a working fluid in a heat engine or as a fuel, depending on its composition and on local requirements. If its methane content is high enough it may be used for synthesis gas generation.

The present invention provides an alternative ammonia production process in which excess nitrogen is separated from both the synthesis gas stream before ammonia synthesis and from the purge gas which results from ammonia synthesis.

SUMMARY OF THE INVENTION

According to the present invention there is provided an ammonia production process which comprises (1) producing a raw synthesis gas containing hydrogen and nitrogen with a stoichiometric excess of nitrogen, generally of at last 200 mole percent, based on that needed for ammonia synthesis, together with carbon oxides (2) treating the raw synthesis gas in a cryogenic separator to separate (1) a hydrogen-nitrogen feed gas stream having a predetermined nitrogen:hydrogen ratio suitable for ammonia synthesis and (2) a nitrogen-rich gas stream, (3) injecting the hydrogen:nitrogen gas stream into a reactor for ammonia synthesis, and (4) treating at least a portion of the purge gas resulting from the ammonia synthesis to separate a stream enriched in hydrogen and returning such hydrogen enriched stream to the synthesis,
in which at least a portion of the purge gas is partially liquified and fractionated to produce said hydrogen enriched stream and a liquid stream rich in nitrogen and free of carbon oxides said liquid stream rich in nitrogen and free of carbon oxides being used to contact the raw synthesis gas in the cryogenic separator to separate nitrogen and carbon oxides therefrom.

The process of the invention removes excess nitrogen and traces of carbon oxides from raw ammonia synthesis gas firstly by application of partial condensation and secondly by application of washing action provided by carbon oxides-free liquified gas, rich in nitrogen, which is derived from a cryogenic process used preferentially for separation of hydrogen from the ammonia synthesis loop purge gas as produced in processes which use excess of nitrogen above stoichiometric requirements in the circulating gas in the synthesis loop.

It has been found that it is possible to integrate certain aspects of the APO and AMV processes to provide a new process having an entirely new balance of energetic provision and use. In particular the process of the invention can achieve the following advantages:

pressure energy of the purge gas can be more effectively utilised by isentropic expansion in a turbine
elimination of the requirement to methanate wholly or partially the synthesis gas from the APO derived process, because the liquified portion of the purge gas can be used to provide the washing function required to remove carbon monoxide from the synthesis gas liquified portion of the purge gas can be used to provide the washing function required to remove carbon monoxide from the synthesis gas
the waste gases from the plant are able to emerge at a higher pressure, which is advantageous elsewhere in the synthesis gas preparation process
hydrogen recovery from the purge gas is accomplished in order to satisfy the material balance of the process a a whole.

Comparing the various stages in an APO process and an AMV process the following points are apparent.

A typical synthesis gas leaving the carbon dioxide removal section of the APO scheme consists of components as follows:

TABLE 1

| | |
|---|---|
| $H_2$ | 49.94 mol % |
| CO | 0.72 |
| $N_2$ | 48.45 |
| $CH_4$ | 0.24 |
| A | 0.65 |
| | 100.00 |

A gas of this composition contains a large excess of nitrogen with respect to ammonia synthesis which is removed in a cryogenic separator prior to injection in the reactor.

In the AMV process the typical synthesis gas fed to the reactor consists of the following components:

TABLE 2

| | |
|---|---|
| $H_2$ | 69.87 |
| $N_2$ | 28.02 |
| $CH_4$ | 1.74 |
| A | 0.74 |
| | 100.00 |

Thus the ratio of $H_2$ to $N_2$ in the two synthesis gases at these stages is:
APO synthesis gas 1.031
AMV synthesis gas 2.49

In the AMV process the excess nitrogen is effectively removed in the purge gas, the hydrogen enriched stream being injected into the reactor with the synthesis gas. The composition of the purge gas after ammonia washing and drying is typically:

TABLE 3

| | |
|---|---|
| $H_2$ | 64.16 |
| $N_2$ | 27.89 |
| $CH_4$ | 6.4 |
| A | 1.55 |
| | 100.00 | and it is available at pressure of 80 to 120 bar abs.

We have found that the synthesis gas composition derived from an APO process may readily be adjusted to a composition similar to that injected into the reactor in the AMV process by simultaneously removing carbon oxides and nitrogen by refrigeration, the refrigeration requirement being substantially provided by the liquid stream rich in nitrogen which is obtained when the purge gas is treated to separate hydrogen therefrom, supplemented by the liquid stream obtained from the primary nitrogen separation.

The raw synthesis gas used in the invention may be derived from any source. For example the synthesis gas may be produced by non-catalytic partial oxidation of hydrocarbon feedstocks using air, preferably heated air, as the oxidant as in the case of the APO process. Alternatively the raw synthesis gas may be produced by catalytic partial oxidation of hydrocarbon feedstocks by using air as the oxidant. The raw synthesis gas is preferably produced at a pressure in the range 25 to 85 bar absolute and contains excess of nitrogen above the stoichiometric requirement for ammonia synthesis. Preferably the molar ratio of hydrogen to nitrogen in the raw synthesis gas is in the range 0.8 to 2.

The ammonia synthesis loop is preferably operated at a pressure in the range 75 to 120 bar absolute. The gas inlet to the ammonia reactor preferably contains slight excess of nitrogen above the stoichiometric requirement, generally the molar ratio of hydrogen to nitrogen at the inlet is in the range 2 to 2.9.

The invention will now be described with reference to the accompanying drawing which represents a simplified flow diagram of a part of an ammonia plant suitable for use in the invention.

The accompanying drawing shows the following main components

A heat exchanger block
B fractionation tower for synthesis gas
C fractionation tower for purge gas
D expansion turbine
E synthesis gas compressor
F recycle gas compressor.

The synthesis gas in stream 1 derived from the APO process of typical composition is shown in Table 1 and generally at a pressure of 30 to 80 bar is cooled and partialy liquified. The stream is then fed to a fractionator B wherein it is contacted by a stream of liquid gas free of carbon monoxide derived from fractionator C (described herinafter).

The excess nitrogen and the major part of impurities like carbon oxides, argon and methane are retained in the liquified stream 3 and the composition of the synthesis gas is adjusted by temperature control and pressure control of the waste gas 10, and for the pressure and temperature of stream 6, to be close to that as shown in Table 2 above.

The purge gas from the ammonia synthesis after removal of ammonia is shown as stream 4. This gas typically has a composition as shown in Table 3. The gas in stream 4 is cooled in the exchanger block A and is divided into two portions stream 5 and stream 7. Stream 5 is then expanded in the turbine D and the gas is cooled by extraction of energy. Stream 7 is cooled in the heat exchanger block A by the waste gas 10 which has been reduced in pressure and by a portion of the expanded stream 5, now stream 6. Stream 7 is partially liquified and fed into fractionator C. In this fractionator stream 7 is separated into 3 portions, stream 8 rich in hydrogen, stream 9 rich in nitrogen and stream 11 rich in methane and argon. Stream 3 containing nitrogen and impurities separated form the synthesis gas and stream 11 are combined, reduced in pressure and reheated in the heat exchanger block A. Stream 8 which is rich in hydrogen is similarly reheated and joins stream 2 as the synthesis make up gas to be compressed in E and injected into the reactor (not shown). Stream 6 may optionally be divided again to produce stream 12 to provide a condenser duty in fractionator C. Stream 9 which is rich in nitrogen and free of carbon oxides is passed to the fractionation tower B to provide refrigeration for separation of nitrogen and impurities from the synthesis gas. Stream 12 and 6 are reheated in block A and become waste gases to be used for production of power elsewhere in the process.

Whilst the above described process utilizes an APO process for the production of raw synthesis gas it will be appreciated that the process of the invention is applicable to a hydrogen-nitrogen gas stream obtained from any source.

I claim:

1. An ammonia production process which comprises
    (1) producing a raw synthesis gas containing hydrogen and nitrogen with a stoichiometric excess of nitrogen based on that needed for ammonia synthesis, together with carbon oxides,
    (2) treating the raw synthesis gas in a cryogenic separator to separate (1) a hydrogen-nitrogen feed gas stream having a predetermined nitrogen:hydrogen ratio suitable for ammonia synthesis and (2) a nitrogen-rich gas stream,
    (3) injecting the hydrogen:nitrogen gas stream into a reactor for ammonia synthesis, and
    (4) treating at least a portion of the purge gas resulting from the ammonia synthesis to separate a stream enriched in hydrogen and returning such hydrogen enriched stream to the synthesis,
in which at least a portion of the purge gas is partially liquified and fractionated to produce said hydrogen enriched stream and a liquid stream rich in nitrogen and free of carbon oxides said liquid stream rich in nitrogen and free of carbon oxides being used to contact the raw synthesis gas in the cryogenic separator to separate nitrogen and carbon oxides therefrom.

2. A process as claimed in claim 1 in which the raw synthesis gas is produced by means of non catalytic partial oxidation of hydrocarbon feedstocks by the use of hot air oxidant.

3. A process as claimed in claim 1 in which the raw synthesis gas is produced by catalytic partial oxidation of hydrocarbon feedstocks by the use of hot air oxidant.

4. A process as claimed in any one of claims 1-3 in which the hydrogen recovery process is a cryogenic process and is used in conjunction with the ammonia synthesis loop operating at pressures between 75 to 120 bar absolute and in which the gas at the inlet to the ammonia reactor contains excess of nitrogen above the stoichiometric requirement for ammonia synthesis.

5. A process as claimed in claim 4 in which the molar ratio of hydrogen to nitrogen in the gas at the inlet to the ammonia reactor is in the range 2 to 2.9.

6. A process as claimed in any one of claims 1-3 in which the raw synthesis gas is produced at a pressure range of 25 to 85 bar absolute.

7. A process as claimed in any one of claims 1-3 in which the molar ratio of hydrogen to nitrogen in the raw synthesis gas is in the range 0.8 to 2.

* * * * *